United States Patent
Ota

(10) Patent No.: US 9,357,074 B2
(45) Date of Patent: May 31, 2016

(54) COMMUNICATION APPARATUS

(71) Applicant: BROTHER KOGYO KABUSHIKI KAISHA, Nagoya-shi, Aichi-ken (JP)

(72) Inventor: Yuichi Ota, Anjo (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/515,809

(22) Filed: Oct. 16, 2014

(65) Prior Publication Data

US 2015/0126162 A1 May 7, 2015

(30) Foreign Application Priority Data

Nov. 6, 2013 (JP) ................. 2013-230498

(51) Int. Cl.
*H04M 1/725* (2006.01)
*H04M 3/533* (2006.01)
*H04W 4/12* (2009.01)

(52) U.S. Cl.
CPC ............ *H04M 3/53333* (2013.01); *H04W 4/12* (2013.01)

(58) Field of Classification Search
CPC .............................................. H04L 29/08108
USPC ...................................... 455/412.1
See application file for complete search history.

(56) References Cited

U.S. PATENT DOCUMENTS

| | | | |
|---|---|---|---|
| 6,336,038 B1* | 1/2002 | Nojima et al. ................ 455/557 |
| 7,251,318 B1* | 7/2007 | Henderson ............... 379/142.04 |
| 8,744,412 B1* | 6/2014 | Cazanas et al. ............. 455/412.1 |
| 2005/0204399 A1* | 9/2005 | Matsunobu et al. .......... 725/117 |
| 2007/0121528 A1* | 5/2007 | Sakata et al. ................. 370/254 |
| 2008/0272889 A1* | 11/2008 | Symons ...................... 340/10.1 |
| 2009/0022107 A1* | 1/2009 | Kapoor et al. ............... 370/331 |
| 2014/0024399 A1* | 1/2014 | Shimo et al. ................ 455/457 |

FOREIGN PATENT DOCUMENTS

JP 2004-056471 A 2/2004

* cited by examiner

*Primary Examiner* — Santiago Garcia
(74) *Attorney, Agent, or Firm* — Scully, Scott, Murphy & Presser, P.C.

(57) ABSTRACT

A communication apparatus includes a telephone communicator, a detector, a data communicator, and a controller. The telephone communicator is configured to perform communication through a telephone network. The controller is configured to perform: a data receiving process of controlling the telephone communicator to receive data; a storing process of storing, in a storage device, the data received in the data receiving process; a determining process of determining whether a mobile terminal is detected by the detector; and a data transmitting process of, in response to determining that the mobile terminal is detected in the determining process, controlling the data communicator to transmit the data stored in the storage device to the mobile terminal.

17 Claims, 8 Drawing Sheets

COMMUNICATION APPARATUS

CROSS REFERENCE TO RELATED APPLICATIONS

This application claims priority from Japanese Patent Application No. 2013-230498 filed Nov. 6, 2013. The entire content of the priority application is incorporated herein by reference.

TECHNICAL FIELD

The invention relates to technology of reading out data received through a telephone network by using a mobile terminal.

BACKGROUND

A telephone instrument is conventionally known that automatically responds to an incoming telephone call and receives a message from a caller, and transmits the received message to an electronic-mail address stored as a destination address by electronic mail.

SUMMARY

A user sometimes wishes to play a message on a mobile terminal. With the above-described conventional technology, however, a user whose electronic-mail address is not stored in a telephone instrument as the destination address cannot play a message on a mobile terminal.

In view of the foregoing, this specification discloses technology of, by using a mobile terminal, reading out data received through a telephone network by a communication apparatus even if a destination address is not stored in the communication apparatus.

According to one aspect, this specification discloses a communication apparatus including a telephone communicator, a detector, a data communicator, and a controller. The telephone communicator is configured to perform communication through a telephone network. The controller is configured to perform: a data receiving process of controlling the telephone communicator to receive data; a storing process of storing, in a storage device, the data received in the data receiving process; a determining process of determining whether a mobile terminal is detected by the detector; and a data transmitting process of, in response to determining that the mobile terminal is detected in the determining process, controlling the data communicator to transmit the data stored in the storage device to the mobile terminal.

According to another aspect, this specification discloses a communication apparatus including a telephone communicator, a detector, a data communicator, and a controller. The telephone communicator is configured to perform communication through a telephone network. The controller is configured to perform: a data receiving process of controlling the telephone communicator to receive data; a storing process of storing, in a storage device, the data received in the data receiving process; a determining process of determining whether a mobile terminal is detected by the detector; and a data transmitting process of, in response to determining that the mobile terminal is detected in the determining process, controlling the data communicator to transmit the data stored in the storage device to an external apparatus, the mobile terminal being configured to receive data from the external apparatus.

According to still another aspect, this specification discloses a communication system including a mobile terminal and a communication apparatus. The mobile terminal includes a terminal-side data communicator. The communication apparatus includes a telephone communicator, a detector, an apparatus-side data communicator, and a controller. The telephone communicator is configured to perform communication through a telephone network. The controller is configured to perform: a data receiving process of controlling the telephone communicator to receive data; a determining process of determining whether a mobile terminal is detected by the detector; and a data transmitting process of, in response to determining that the mobile terminal is detected in the determining process, controlling the apparatus-side data communicator to transmit the data received in the data receiving process to the mobile terminal via the terminal-side data communicator.

According to still another aspect, this specification discloses a non-transitory computer readable storage medium storing a set of program instructions executable on a mobile terminal having a terminal-side data communicator, a storage device, a display, and a controller. The storage device stores a first identification-information list. The set of program instructions includes: an identification-information receiving process of controlling the terminal-side data communicator to receive, from a communication apparatus storing data received through a telephone network, a second identification-information list including identification information indicative of an originator of the data transmitted to the communication apparatus; a user-selection receiving process of controlling the display to display information associated with identification information that matches identification information included in the first identification-information list out of identification information included in the second identification-information list, and of receiving selection from a user; an identification-information transmitting process of controlling the terminal-side data communicator to transmit, to the communication apparatus, identification information corresponding to information selected in the user-selection receiving process; and a data receiving process of controlling the terminal-side data communicator to receive the data from the communication apparatus.

BRIEF DESCRIPTION OF THE DRAWINGS

Embodiments in accordance with the invention will be described in detail with reference to the following figures wherein.

DETAILED DESCRIPTION

First Embodiment

Figure 1:
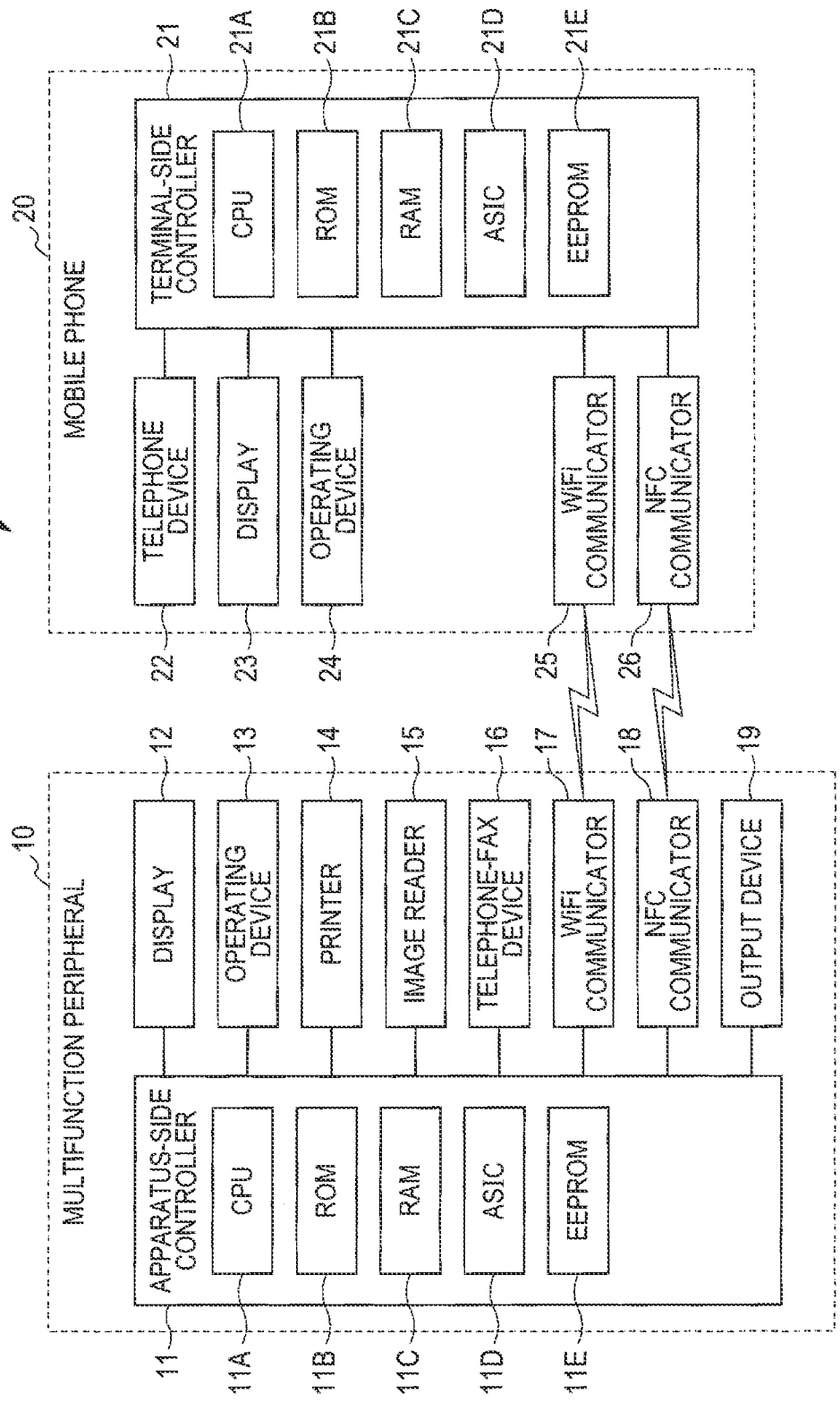
FIG. 1 is a block diagram showing a simplified electrical configuration of a communication system according to a first embodiment.
Figure 2:
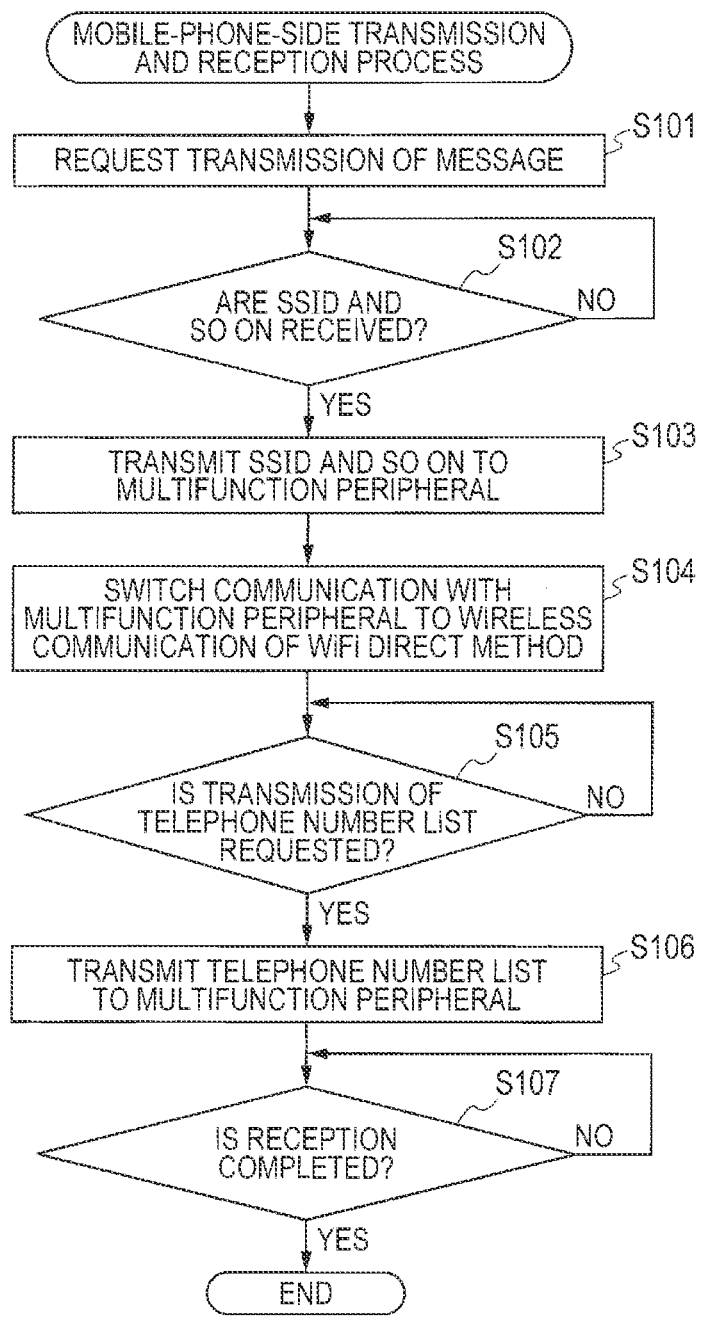
FIG. 2 is a flowchart of a mobile-phone-side transmission and reception process according to the first embodiment.
Figure 3:
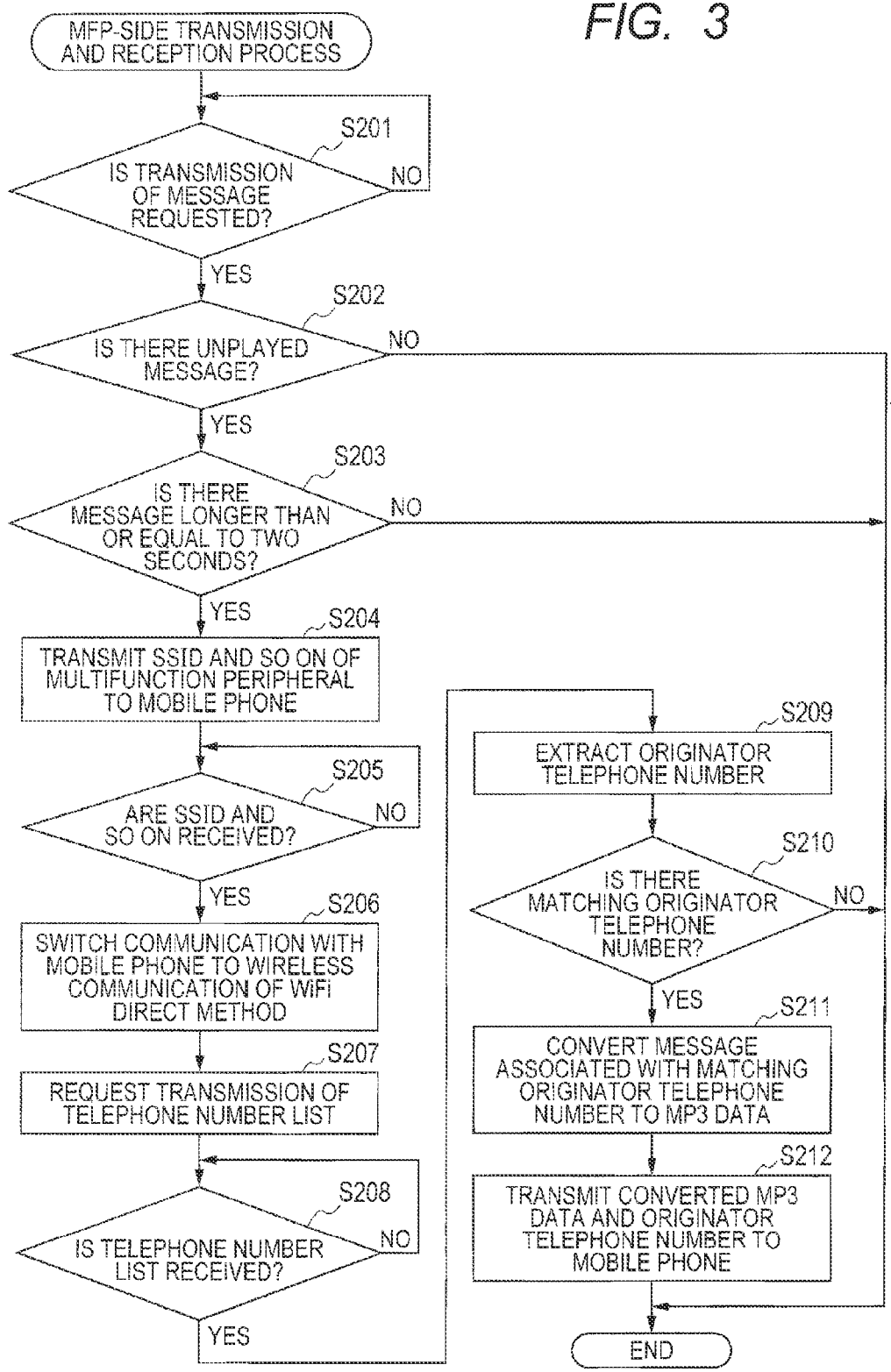
FIG. 3 is a flowchart of an MFP-side transmission and reception process according to the first embodiment.

A first embodiment will be described while referring to FIGS. 1 through 3.

(1) Communication System

First, a communication system 1 according to the first embodiment will be described while referring to FIG. 1. The communication system 1 includes a multifunction peripheral (MFP) 10 and a mobile phone 20. The multifunction peripheral 10 is an example of a communication apparatus. The mobile phone 20 is an example of a mobile terminal.

The multifunction peripheral 10 has a printing function, an image reading function, a copy function, a FAX function, a telephone function, a WiFi wireless communication function, an NFC wireless communication function, and so on. A term "FAX" is an abbreviation of "facsimile". A term "NFC" is an abbreviation of "Near Field Communication". A term "WiFi" is an abbreviation of "Wireless Fidelity".

The mobile phone 20 is a so-called smartphone, and has a mobile phone function for having phone calls through base stations of a mobile phone network, a WiFi wireless communication function, a NFC wireless communication function, and so on.

(1-1) Electrical Configuration of Multifunction Peripheral

The multifunction peripheral 10 includes an apparatus-side controller 11, a display 12, an operating device 13, a printer 14, an image reader 15, a telephone-FAX device 16, a WiFi communicator 17, an NFC communicator 18, an output device 19, and so on.

The apparatus-side controller 11 includes a CPU 11A, a ROM 11B, a RAM 11C, an ASIC 11D, an EEPROM 11E, and so on. The CPU 11A executes control programs stored in the ROM 11B to control each section of the multifunction peripheral 10. The ROM 11B stores control programs executed by the CPU 11A, various data, and so on. The RAM 11C is used as the main storage device for the CPU 11A to execute various processes. The EEPROM 11E is a non-volatile memory that stores various data. The RAM 11C and the EEPROM 11E are an example of a storage device.

The display 12 includes a display device such as a liquid crystal display, a driving circuit for driving the display device, and so on.

The operating device 13 includes a touch panel covering the display 12. A user can perform various operations by touching, over the touch panel, operation buttons displayed on the display 12.

The printer 14 prints an image on a sheet such as printing paper by an electro-photographic method, an inkjet method, or the like.

The image reader 15 includes an image sensor, a platen glass, a platen cover, and so on. The image reader 15 reads an original document placed on the platen glass by using the image sensor, and generates image data. Further, an ADF (Auto Document Feeder) is provided at the platen cover. The image reader 15 also reads a plurality of original documents while conveying one sheet at a time by the ADF.

The telephone-FAX device 16 includes an NCU (Network Control Unit), a modem, a telephone receiver, an off-hook detector, a speaker for emitting incoming call sound, and so on. The off-hook detector is a switch that is turned on and off mechanically for detecting "off hook" which is a state in which the telephone receiver is off the hook, and "on hook" which is a state in which the telephone receiver is placed at its original position.

The telephone-FAX device 16 is connected to a telephone network. The apparatus-side controller 11 controls the telephone-FAX device 16 to receive voice data from an external telephone instrument and to receive FAX data from an external FAX apparatus. The apparatus-side controller 11's process of controlling the telephone-FAX device 16 to receive voice data and FAX data is an example of a data receiving process.

The WiFi communicator 17 is a hardware interface for performing wireless communication using WiFi with the mobile phone 20. The wireless communication using WiFi will be described later. The WiFi communicator 17 is an example of a data communicator and an apparatus-side data communicator.

The NFC communicator 18 is a hardware interface for performing wireless communication using NFC with the mobile phone 20. The wireless communication using NFC will be described later. The NFC communicator 18 is an example of a detector and a wireless communicator.

The output device 19 includes a speaker, an amplifier, and so on. The output device 19 is used for emitting incoming call sound when the telephone-FAX device 16 receives an incoming call and for playing an answerphone message described later.

(1-2) Electrical Configuration of Mobile Phone

The mobile phone 20 includes a terminal-side controller 21, a telephone device 22, a display 23, an operating device 24, a WiFi communicator 25, an NFC communicator 26, and so on. The configurations of the terminal-side controller 21, the display 23, the operating device 24, the WiFi communicator 25, and the NFC communicator 26 are substantially the same as those of the multifunction peripheral 10, and thus descriptions are omitted. The WiFi communicator 25 is an example of a terminal-side data communicator.

The telephone device 22 includes a microphone and a speaker used for telephone calls, an antenna for performing wireless communication with a base station of a mobile phone network, a control circuit, and so on. The telephone device 22 performs a process of emitting, from the speaker, a voice signal received from the base station, a process of transmitting the voice signal inputted through the microphone to the base station, and so on.

The terminal-side controller 21 includes an EEPROM 21E. The EEPROM 21E stores a communication program of controlling a CPU to receive an answerphone message from the multifunction peripheral 10, a voice playing program of controlling the CPU to play the answerphone message, a telephone directory, and so on. The telephone directory is data including telephone numbers, names associated with the telephone numbers, and so on. The telephone number is an example of identification information. The communication program is an example of a program. The EEPROM 21E is an example of a storage device.

(2) WiFi Wireless Communication Function and NFC Wireless Communication Function Next, the above-described wireless communication function and NFC wireless communication function will be described.

(2-1) WiFi Wireless Communication Function

The "WiFi" refers to wireless communication that is performed based on a standard of IEEE (The Institute of Electrical and Electronics Engineers, Inc.) 802.11 or a similar standard.

The WiFi wireless communication function is provided for transmitting and receiving a large amount of data between the multifunction peripheral 10 and the mobile phone 20 in wireless communication. Specifically, for example, by performing the WiFi wireless communication with the multifunction peripheral 10, the mobile phone 20 transmits a print job to the multifunction peripheral 10, receives, from the multifunction peripheral 10, image data that is generated by reading an original document by the image reading function of the multifunction peripheral 10, and receives an answerphone message described later from the multifunction peripheral 10.

Here, as to the WiFi wireless communication methods, there are a normal WiFi method in which communication is performed through an access point (not shown) and a WiFi direct method in which two wireless devices perform communication one on one without using an access point. In the present embodiment, descriptions are provided for a case in which the multifunction peripheral 10 and the mobile phone 20 perform wireless communication by the WiFi direct method. Or, the multifunction peripheral 10 and the mobile phone 20 may perform wireless communication by the normal WiFi method.

(2-2) NFC Wireless Communication Function

The "NFC" refers to near-field wireless communication that is performed based on the international standards such as ISO/IEC21481 and ISO/IEC18092. Here, the NFC is not limited to near-field wireless communication that is performed based on the international standards. The communication speed (transmission speed) of the NFC wireless communication is lower than the communication speed of the WiFi wireless communication. In other words, the communication speed of the WiFi wireless communication is higher than the communication speed of the NFC wireless communication.

The NFC wireless communication function is provided for establishing wireless communication of the WiFi direct method in a simple manner, for the mobile phone 20 to request the multifunction peripheral 10 to transmit an answerphone message described later, and so on. While the power of the multifunction peripheral 10 is ON, the NFC communicator 18 of the multifunction peripheral 10 transmits polling signals in a constant time interval. When a user brings the mobile phone 20 close to the multifunction peripheral 10 to a position where a distance between the NFC communicator 18 of the multifunction peripheral 10 and the NFC communicator 26 of the mobile phone 20 is within a communication distance in which communication can be performed, the NFC communicator 26 of the mobile phone 20 receives a polling signal transmitted by the NFC communicator 18.

Upon receiving the polling signal, the NFC communicator 26 of the mobile phone 20 transmits a response signal to the NFC communicator 18 of the multifunction peripheral 10. When the NFC communicator 18 of the multifunction peripheral 10 receives the response signal, the multifunction peripheral 10 determines that the mobile phone 20 is detected within the communication distance of the NFC communicator 18.

When it is determined that the mobile phone 20 is detected, the multifunction peripheral 10 establishes NFC wireless communication with the mobile phone 20. The process that the apparatus-side controller 11 of the multifunction peripheral 10 uses the NFC communicator 18 to determine whether the mobile phone 20 is detected is an example of a determining process.

Upon establishing NFC wireless communication with the mobile phone 20, the multifunction peripheral 10 exchanges, with the mobile phone 20, information for establishing wireless communication of the WiFi direct method, such as an SSID (Service Set Identifier), a password, and an IP (Internet Protocol) address. Here, it is not always necessary that the information for establishing wireless communication of the WiFi direct method includes a password.

Then, the multifunction peripheral 10 uses the information to establish wireless communication of the WiFi direct method with the mobile phone 20, and switches communication with the mobile phone 20 to wireless communication of the WiFi direct method.

(3) Storage and Transmission of Answerphone Message

When the telephone-FAX device 16 receives an incoming call and the user does not perform "off hook" after a certain number of times of ringing tone, the multifunction peripheral 10 automatically performs "off hook". When "off hook" is performed automatically and when the incoming call is a FAX incoming call, the multifunction peripheral 10 receives FAX data from a FAX apparatus of the originator, and stores the FAX data in the EEPROM 11E.

On the other hand, when "off hook" is performed automatically and when the incoming call is a telephone incoming call, the multifunction peripheral 10 receives an answerphone message from a telephone instrument of the originator, and stores, in the RAM 11C, the received answerphone message in association with the telephone number of the telephone instrument of the originator. Note that the received answerphone message may be stored in the EEPROM 11E.

In the following descriptions, the telephone number of the telephone instrument of the originator is referred to as "originator telephone number". The answerphone message is an example of data and voice data. The process that the apparatus-side controller 11 stores, in the RAM 11C, the answerphone message in association with the originator telephone number is an example of a storing process.

If the RAM 11C stores an answerphone message, the user can play the answerphone message with the output device 19 of the multifunction peripheral 10, or can transmit the answerphone message to the mobile phone 20 by wireless communication of the WiFi direct method and play the answerphone message on the mobile phone 20. The process that the CPU 11A controls the output device 19 to play the answerphone message is an example of an outputting process.

Here, when the multifunction peripheral 10 of the first embodiment transmits answerphone messages stored in the RAM 11C to the mobile phone 20, the multifunction peripheral 10 does not transmit all of the stored answerphone messages but transmits only answerphone messages that satisfies all of the following conditions.

(a) Answerphone messages associated with originator telephone numbers matching telephone numbers stored in the telephone directory of the mobile phone 20.

(b) Unplayed answerphone messages which have not yet been played by the output device 19 of the multifunction peripheral 10.

(c) Answerphone messages having play time longer than or equal to two seconds, the play time being time required for playing voice data. Two seconds is an example of particular time. Note that the multifunction peripheral 10 may be so configured that a user can set the particular time.

(4) Transmission and Reception Process

Next, a transmission and reception process of transmitting answerphone messages stored in the multifunction peripheral 10 to the mobile phone 20 will be described. The transmission and reception process consists of a mobile-phone-side transmission and reception process executed by the mobile phone 20 and an MFP-side transmission and reception process executed by the multifunction peripheral 10.

(4-1) Mobile-Phone-Side Transmission and Reception Process

First, the mobile-phone-side transmission and reception process executed by the mobile phone 20 will be described while referring to FIG. 2. A CPU 21A of the mobile phone 20 executes the mobile-phone-side transmission and reception process by executing the above-described communication program. This process is started when NFC wireless communication is established between the mobile phone 20 and the multifunction peripheral 10.

In S101, the CPU 21A requests the multifunction peripheral 10 to transmit answerphone messages by NFC wireless communication.

In S102, the CPU 21A determines whether an SSID, a password, an IP address, and so on are received from the multifunction peripheral 10. If these kinds of information are received (S102: Yes), the process advances to S103. If these kinds of information are not received (S102: No), the CPU 21A repeats determination of S102. Here, if a certain time elapses without receiving the information, the process ends.

In S103, the CPU 21A transmits the SSID, the password, the IP address, and so on, of the mobile phone 20 to the multifunction peripheral 10 by NFC wireless communication.

In S104, the CPU 21A establishes wireless communication by the WiFi direct method with the multifunction peripheral 10, and switches communication with the multifunction peripheral 10 to wireless communication of the WiFi direct method.

In S105, the CPU 21A determines whether transmission of a telephone number list is requested from the multifunction peripheral 10. The telephone number list is a list of telephone numbers stored in the telephone directory of the mobile phone 20. If transmission of the telephone number list is requested (S105: Yes), the CPU 21A advances to S106. If transmission of the telephone number list is not requested (S105: No), the CPU 21A repeats determination of S105 until the telephone number list is requested. Here, if a certain time elapses without receiving the request, the process ends.

In S106, the CPU 21A transmits the telephone number list to the multifunction peripheral 10.

In S107, the CPU 21A determines whether reception of answerphone messages from the multifunction peripheral 10 is completed. If reception is completed (S107: Yes), the process ends. If reception is not completed (S107: No), the CPU 21A repeats determination of S107 until reception is completed. The process that the mobile phone 20 uses the WiFi communicator 25 to receive answerphone messages from the multifunction peripheral 10 is an example of a data receiving process.

(4-2) MFP-Side Transmission and Reception Process

Next, an MFP-side transmission and reception process executed by the multifunction peripheral 10 will be described while referring to FIG. 3. The CPU 11A of the multifunction peripheral 10 executes the MFP-side transmission and reception process by executing a control program. This process is started when NFC wireless communication is established between the mobile phone 20 and the multifunction peripheral 10.

In S201, the CPU 11A determines whether transmission of answerphone messages is requested from the mobile phone 20. If transmission of the answerphone messages is requested (S201: Yes), the CPU 11A advances to S202. If transmission of the answerphone messages is not requested (S201: No), the CPU 11A repeats determination of S201 until transmission is requested. Here, if a certain time elapses without receiving the request, the process ends.

In S202, the CPU 11A determines whether the RAM 11C stores an unplayed answerphone message. If the RAM 11C stores an unplayed answerphone message (S202: Yes), the process advances to S203. If the RAM 11C stores no unplayed answerphone message (S202: No), the process ends.

In S203, the CPU 11A determines whether the unplayed answerphone message includes an answerphone message having play time longer than or equal to two seconds. Specifically, for example, the CPU 11A determines whether there is an answerphone message having a data amount corresponding to play time longer than or equal to two seconds. If there is such answerphone message (S203: Yes), the process advances to S204. If there is no such answerphone message (S203: No), the process ends.

In S204, the CPU 11A transmits an SSID, a password, an IP address, and so on, of the multifunction peripheral 10 to the mobile phone 20 by NFC wireless communication.

In S205, the CPU 11A determines whether an SSID, a password, an IP address, and so on are received from the mobile phone 20. If such information is received (S205: Yes), the process advances to S206. If such information is not received (S205: No), the CPU 11A repeats determination of S205. Here, if a certain time elapses without receiving the information, the process ends.

In S206, the CPU 11A establishes wireless communication of the WiFi direct method with the mobile phone 20, and switches communication with the mobile phone 20 to wireless communication of the WiFi direct method.

In S207, the CPU 11A requests the mobile phone 20 to transmit a telephone number list.

In S208, the CPU 11A determines whether the telephone number list is received from the mobile phone 20. If the telephone number list is received (S208: Yes), the process advances to S209. If the telephone number list is not received (S208: No), the CPU 11A repeats determination of S208 until the telephone number list is received. Here, if a certain time elapses without receiving the telephone number list, the process ends.

In S209, the CPU 11A extracts an originator telephone number associated with the answerphone message having play time longer than or equal to two seconds, out of unplayed answerphone messages.

In S210, the CPU 11A determines whether the originator telephone number extracted in S209 includes an originator telephone number matching a telephone number included in the telephone number list received from the mobile phone 20. If so (S210: Yes), the process advances to S211. If not (S210: No), the process ends.

In S211, the CPU 11A converts, to a data format that is playable on the mobile phone 20, a data format of the answerphone message associated with the originator telephone number matching a telephone number included in the telephone number list received from the mobile phone 20.

Here, the mobile phone 20 is capable of playing voice data of an MP3 (MPEG Audio Layer-3) format, and the multifunction peripheral 10 converts the data format of the answerphone message to the MP3 format. In the following description, voice data of the MP3 format is simply referred to as MP3 data.

Note that a process of converting the data format takes time to some extent. Thus, before starting the process of S211, the multifunction peripheral 10 may transmit, to the mobile phone 20, a message indicating that conversion is currently being processed. The mobile phone 20 may display the message on the display 23 to provide a notification to the user.

In S212, the CPU 11A controls the WiFi communicator 17 to transmit, to the mobile phone 20, the MP3 data converted in S211 and the originator telephone number associated with the answerphone message converted to the MP3 data, via the WiFi communicator 25 of the mobile phone 20. The process of S212 is an example of a data transmitting process.

After transmitting MP3 data, the multifunction peripheral 10 may delete the MP3 data from the RAM 11C, or may delete, from the RAM 11C, the MP3 data and the answerphone message converted to the MP3 data.

(5) Effects of Embodiment

According to the above-described multifunction peripheral 10, even without preliminarily storing destination addresses such as electronic-mail addresses in the multifunction peripheral 10, by bringing the mobile phone 20 close to the NFC communicator 18 of the multifunction peripheral 10, a user of the mobile phone 20 can play, on the mobile phone 20, an answerphone message that is received by the multifunction peripheral 10 through a telephone network.

Further, the multifunction peripheral 10 transmits, to the mobile phone 20, an answerphone message and an originator telephone number associated with the answerphone message. Thus, the user of the mobile phone 20 can easily contact the originator of the answerphone message.

Further, the multifunction peripheral 10 transmits, to the mobile phone 20, an unplayed answerphone message out of answerphone messages stored in the RAM 11C. It is less likely that the user desires to receive an answerphone message that has been already played by the output device 19, out of answerphone messages stored in the RAM 11C. Because the multifunction peripheral 10 transmits the unplayed answerphone message, the multifunction peripheral 10 can transmit the answerphone message that the user of the mobile phone 20 is likely to desire to receive, which is convenient for the user.

Further, the multifunction peripheral 10 transmits an answerphone message having play time longer than or equal to two seconds, and does not transmit an answerphone message having play time shorter than two seconds. Generally, it is assumed that answerphone message having play time shorter than two seconds is an invalid answerphone message that probably does not need to be transmitted to the mobile phone 20. The multifunction peripheral 10 can prevent an answerphone message assumed to be invalid from being transmitted to the mobile phone 20.

Further, the multifunction peripheral 10 determines that the mobile phone 20 is detected when communication is established with the mobile phone 20 via the NFC communicator 18. The NFC wireless communication between the mobile phone 20 and the multifunction peripheral 10 cannot be performed unless the mobile phone 20 comes close to within the communication distance of the NFC communicator 18. To put it the other way around, if the multifunction peripheral 10 can perform communication with the mobile phone 20 via the NFC communicator 18, the mobile phone 20 is within the communication distance of the NFC communicator 18. Accordingly, it can be determined that, if the multifunction peripheral 10 can perform communication with the mobile phone 20 via the NFC communicator 18, the mobile phone 20 is detected within the communication distance of the NFC communicator 18.

Further, the multifunction peripheral 10 transmits answerphone messages by using the WiFi communicator 17 having a higher communication speed than the communication speed of the NFC communicator 18. Thus, answerphone messages can be transmitted in shorter time than a case in which the NFC communicator 18 is used for transmission.

Further, the multifunction peripheral 10 receives the telephone number list from the mobile phone 20, and transmits, to the mobile phone 20, the answerphone message associated with the originator telephone number matching the telephone number included in the received telephone number list. It is assumed that there is a high degree of relationship between the user of the mobile phone 20 and the answerphone message received from the originator of the telephone number matching the telephone number included in the telephone number list of the mobile phone 20. The multifunction peripheral 10 can transmit, to the mobile phone 20, the answerphone message assumed to have a high degree of relationship with the user of the mobile phone 20.

Second Embodiment

Figure 4:
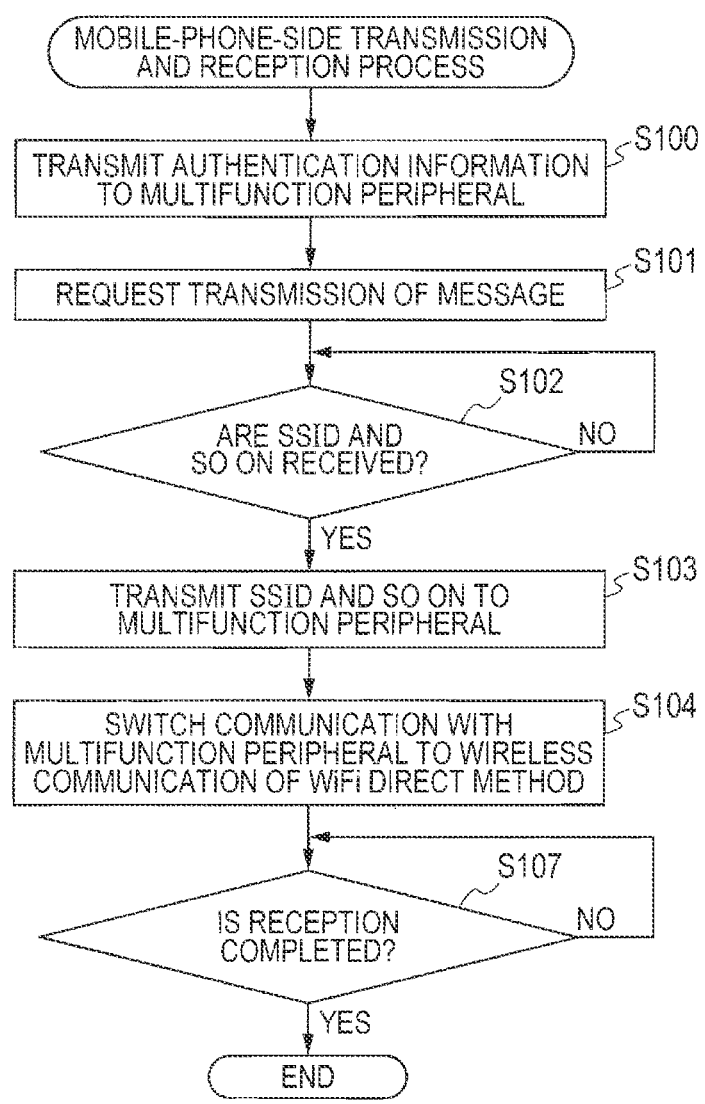
FIG. 4 is a flowchart of a mobile-phone-side transmission and reception process according to a second embodiment.
Figure 5:
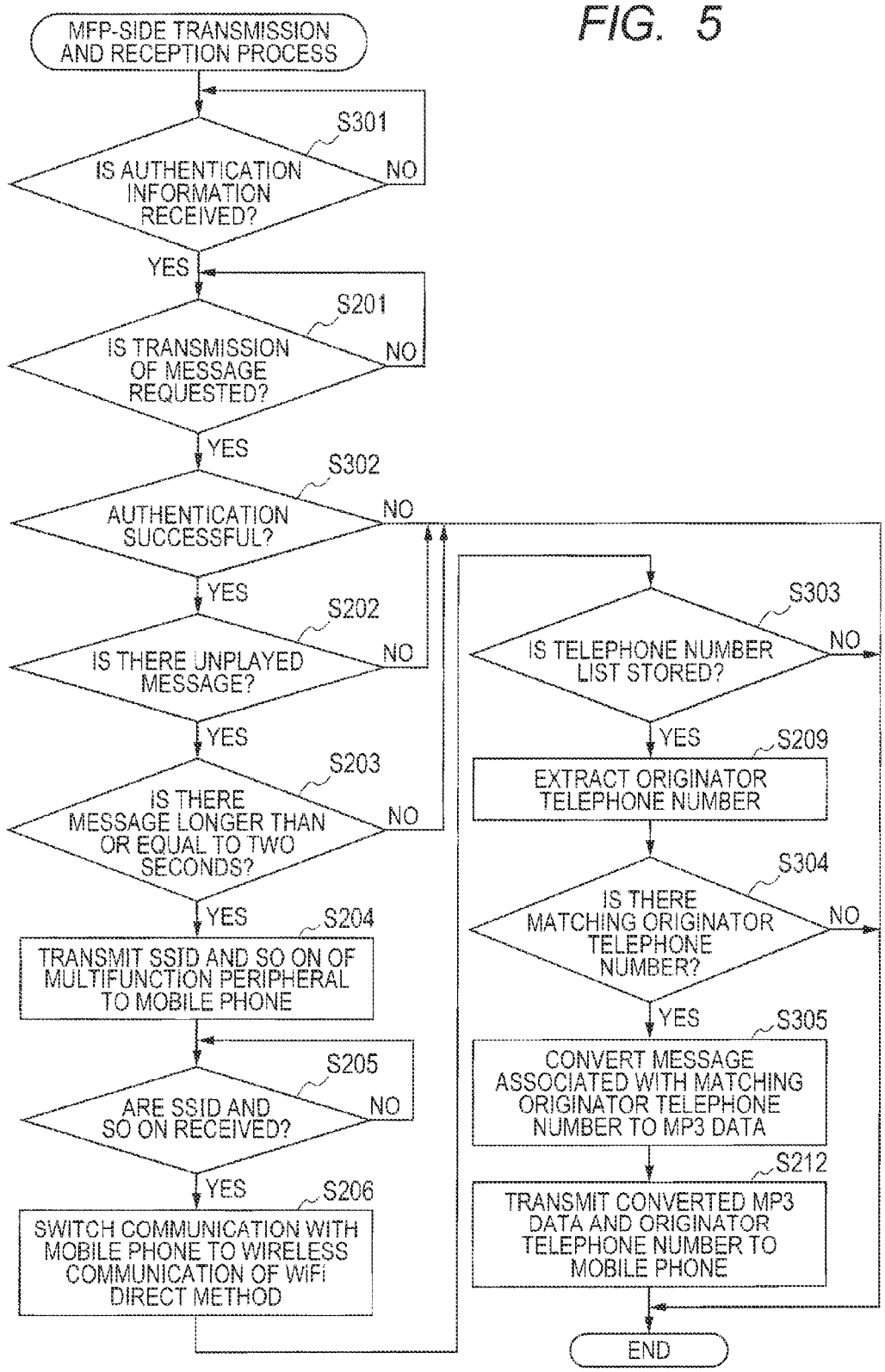
FIG. 5 is a flowchart of an MFP-side transmission and reception process according to the second embodiment.

Next, a second embodiment will be described while referring to FIGS. 4 and 5.

In the above-described first embodiment, the multifunction peripheral 10 receives a telephone number list from the mobile phone 20, and transmits, to the mobile phone 20, the answerphone message associated with the originator telephone number matching the telephone number included in the received telephone number list.

On the other hand, the multifunction peripheral 10 according to the second embodiment stores a telephone number list for each user. When transmitting an answerphone message stored in the RAM 11C to the mobile phone 20, the multifunction peripheral 10 transmits, to the mobile phone 20, an answerphone message associated with an originator telephone number matching a telephone number included in the telephone number list of the user who has inputted authentication information on the multifunction peripheral 10, out of the telephone number lists of respective users stored in the multifunction peripheral 10.

(1) Authentication Information

First, authentication information will be described.

In the second embodiment, when using the image reading function, the copy function, and so on or when transmitting an answerphone message stored in the multifunction peripheral 10 to the mobile phone 20, the user preliminarily inputs authentication information on the multifunction peripheral 10 to log in to the multifunction peripheral 10.

It is only necessary that authentication information be information that can uniquely identify a user. For example, the authentication information may be a user ID or combination of a user ID and a password. Or, the authentication information may be only a password. In a case where the authentication information is only a password, the EEPROM 11E of the multifunction peripheral 10 preliminarily stores user IDs and passwords in association with each other. Hence, the multifunction peripheral 10 can uniquely identify a user only with a password. The authentication information is an example of user information.

Input of authentication information may be performed by operating the operating device 13 of the multifunction peripheral 10, or may be performed by NFC wireless communication. Here, input of authentication information is performed by NFC wireless communication. Specifically, when the user brings the mobile phone 20 close to the NFC communicator 18 of the multifunction peripheral 10, NFC wireless communication is established between the mobile phone 20 and the multifunction peripheral 10, and authentication information stored in the mobile phone 20 is transmitted to the multifunction peripheral 10 by NFC wireless communication. The process that the multifunction peripheral 10 receives authentication information from the mobile phone 20 by NFC wireless communication is an example of an acquiring process.

When authentication information is inputted, the multifunction peripheral 10 performs authentication by using the inputted authentication information. If authentication is successful, the multifunction peripheral 10 is set to a login state in which the multifunction peripheral 10 can be used, and wireless communication with the mobile phone 20 is switched to wireless communication of the WiFi direct method. On the other hand, if authentication fails, the multifunction peripheral 10 neither permits use of the multifunction peripheral 10 nor switches wireless communication with the mobile phone 20 to wireless communication of the WiFi direct method. Thus, if authentication fails, no answerphone message is transmitted from the multifunction peripheral 10 to the mobile phone 20.

(2) Telephone Number List for Each User

Next, a telephone number list for each user will be described. Each user can preliminarily store his or her own telephone number list in the EEPROM 11E of the multifunction peripheral 10. For example, when a user having succeeded in authentication makes a telephone call from the multifunction peripheral 10 to an external telephone instrument, he or she operates the operating device 13 to instruct the multifunction peripheral 10 to display the telephone number list. Upon receiving instruction of displaying the telephone number list, the multifunction peripheral 10 displays the telephone number list of the user who is currently logged in. The user can select a desired telephone number from his or her own telephone number list that is displayed.

(3) Mobile-Phone-Side Transmission and Reception Process

Next, a mobile-phone-side transmission and reception process according to the second embodiment will be described while referring to FIG. 4. Here, steps that are substantially the same as those in the mobile-phone-side transmission and reception process of the first embodiment are designated by the same reference numerals to avoid duplicating description.

In S100, the CPU 21A transmits authentication information to the multifunction peripheral 10 by NFC wireless communication.

In the mobile-phone-side transmission and reception process according to the second embodiment, steps S105 and S106 in the mobile-phone-side transmission and reception process of the first embodiment are not executed.

(4) MFP-Side Transmission and Reception Process

Next, an MFP-side transmission and reception process according to the second embodiment will be described while referring to FIG. 5. Here, steps that are substantially the same as those in the MFP-side transmission and reception process of the first embodiment are designated by the same reference numerals to avoid duplicating description.

In S301, the CPU 11A determines whether authentication information is received from the mobile phone 20. If authentication information is received (S301: Yes), the process advances to S201. If authentication information is not received (S301: No), the CPU 11A repeats determination of S301 until authentication information is received. Here, if a certain time elapses without receiving authentication information, the process ends.

In S302, the CPU 11A determines whether authentication using the received authentication information is successful. Here, authentication using authentication information is performed in another process different from the transmission and reception process, and the CPU 11A refers to an authentication result of the other process. If authentication is successful (S302: Yes), the CPU 11A advances to S202. If authentication fails (S302: No), the process ends.

In S303, the CPU 11A determines whether the EEPROM 11E stores the telephone number list of the user indicated by the authentication information. If the telephone number list is stored (S303: Yes), the process advances to S209. If the telephone number list is not stored (S303: No), the process ends.

In S304, the CPU 11A determines whether the originator telephone number extracted in S209 includes an originator telephone number matching a telephone number included in the telephone number list of the user indicated by the authentication information. If so (S304: Yes), the process advances to S305. If not (S304: No), the process ends.

In S305, the CPU 11A converts, to MP3 data, the answerphone message associated with the originator telephone number matching a telephone number included in the telephone number list of the user indicated by the authentication information, out of the originator telephone number extracted in S209.

(5) Effects of Embodiment

According to the above-described multifunction peripheral 10, the multifunction peripheral 10 transmits, to the mobile phone 20, the answerphone message associated with the originator telephone number matching a telephone number included in the telephone number list of the user of the mobile phone 20, out of telephone number lists for respective users stored in the multifunction peripheral 10. It is assumed that there is a high degree of relationship between the user of the mobile phone 20 and the answerphone message received from the originator of the telephone number matching a telephone number included in the telephone number list of the user of the mobile phone 20. Thus, the multifunction peripheral 10 can transmit, to the mobile phone 20, an answerphone message assumed to have a high degree of relationship with the user of the mobile phone 20.

Third Embodiment

Figure 6:
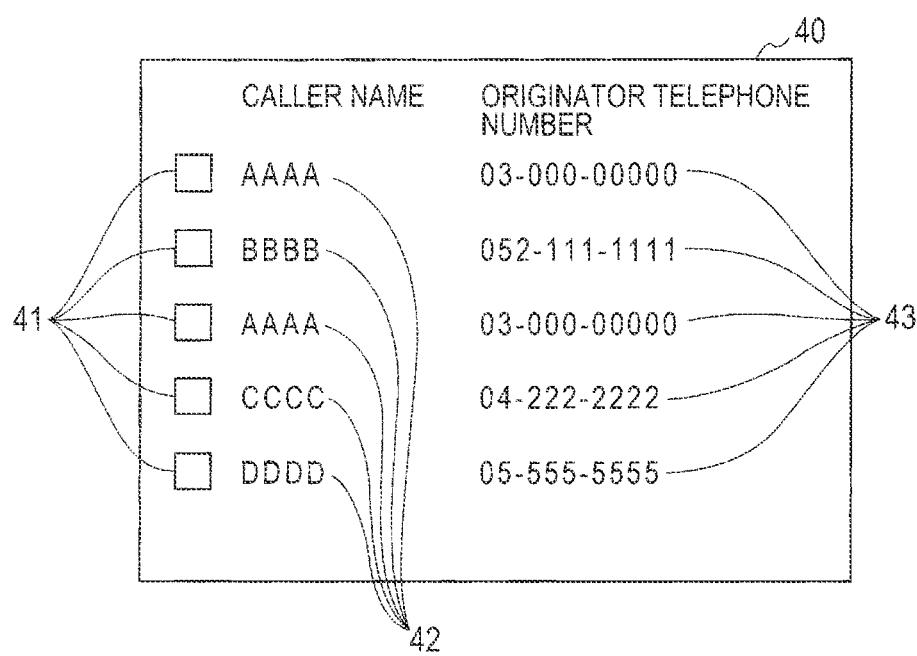
FIG. 6 is an explanatory diagram of a selection screen according to a third embodiment.
Figure 7:
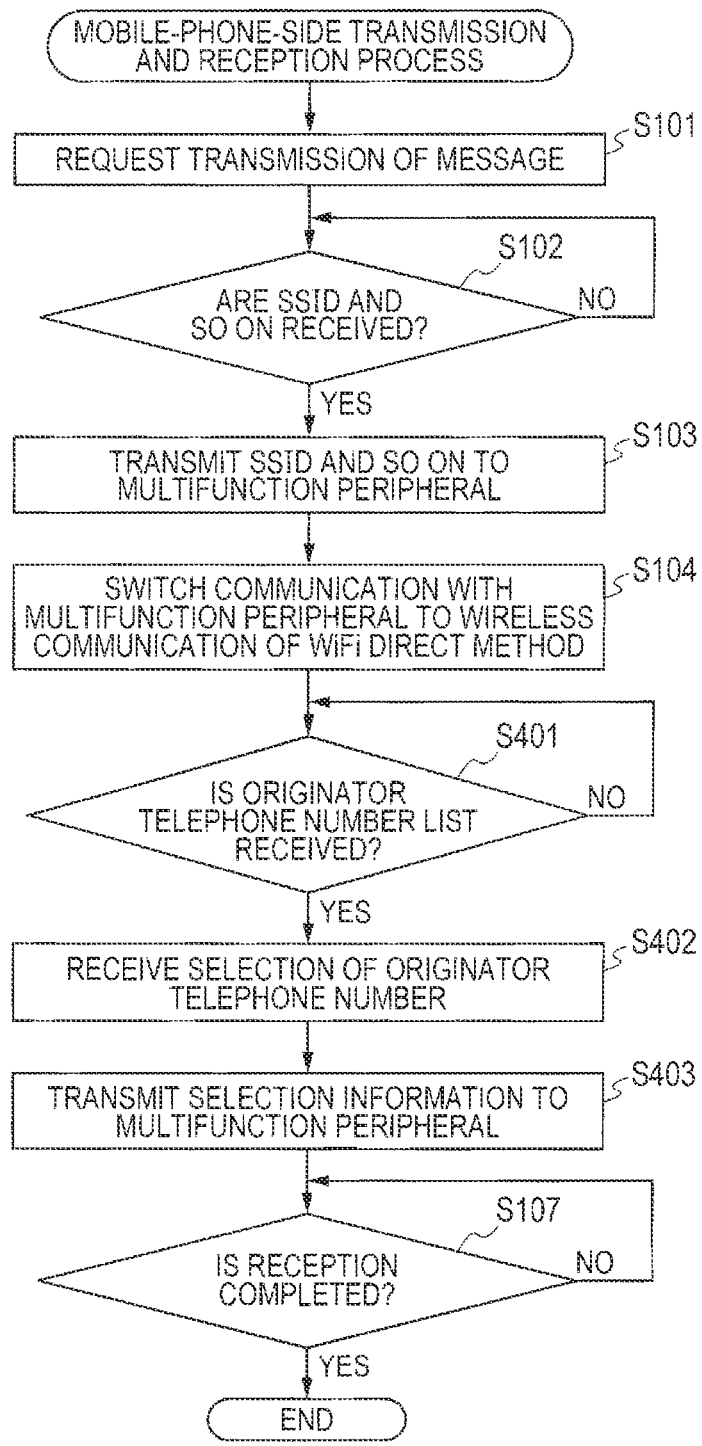
FIG. 7 is a flowchart of a mobile-phone-side transmission and reception process according to the third embodiment.
Figure 8:
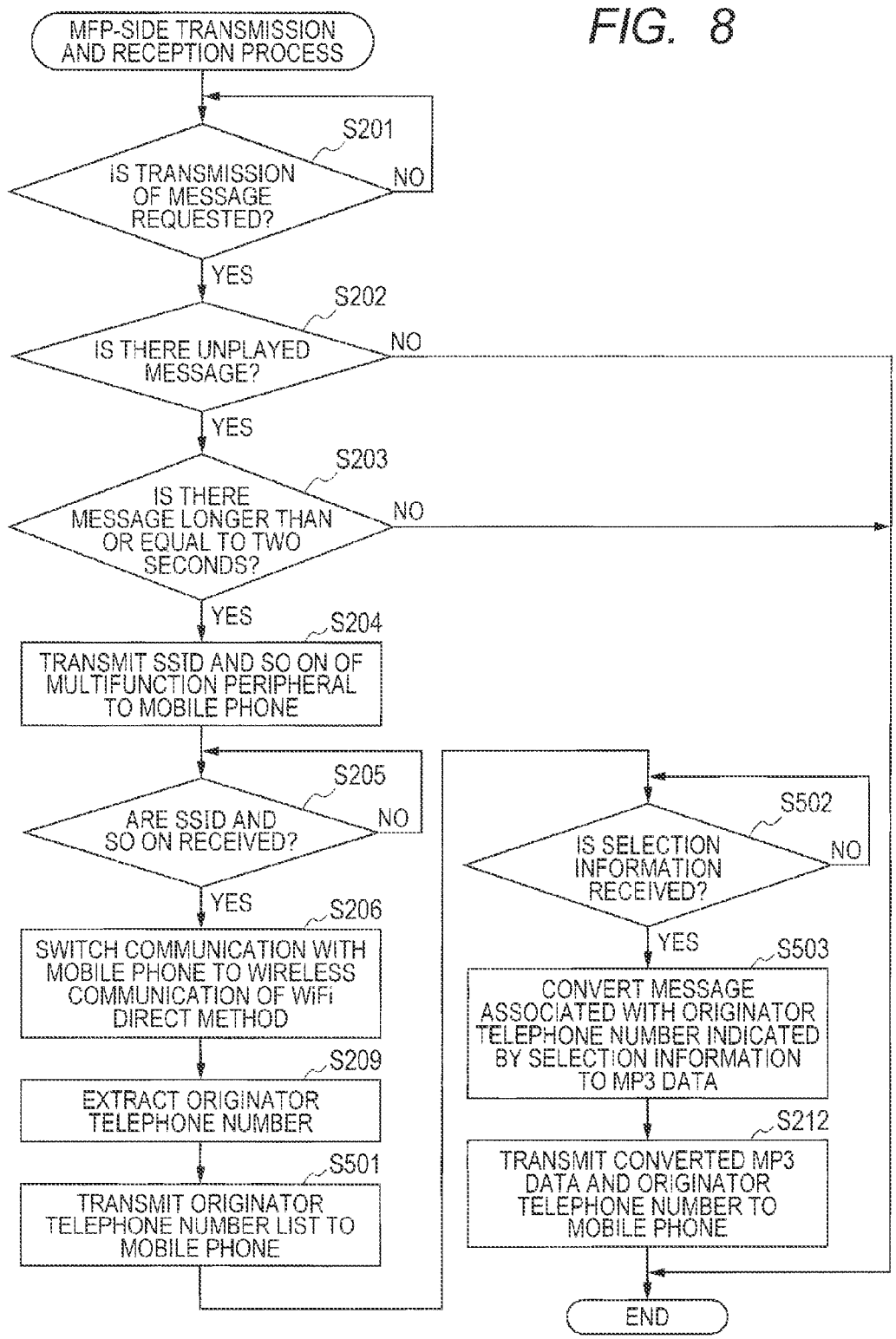
FIG. 8 is a flowchart of an MFP-side transmission and reception process according to the third embodiment.

Next, a third embodiment will be described while referring to FIGS. 6 through 8.

In the third embodiment, the user of the mobile phone 20 can select an answerphone message transmitted to the mobile phone 20. Specifically, the multifunction peripheral 10 of the third embodiment transmits, to the mobile phone 20, an originator telephone number list consisting of originator telephone numbers associated with unplayed answerphone messages stored in the RAM 11C and having play time longer than or equal to two seconds.

Upon receiving an originator telephone number list from the multifunction peripheral 10, the mobile phone 20 receives, from the user, selection of an originator telephone number for receiving an answerphone message from the received originator telephone number list, and transmits to the multifunction peripheral 10 selection information indicative of the originator telephone number selected by the user. Upon receiving selection information from the mobile phone 20, the multifunction peripheral 10 transmits, to the mobile phone 20, the answerphone message associated with the originator telephone number indicated by the selection information.

(1) Selection Screen

First, a selection screen 40 displayed on the display 23 of the mobile phone 20 will be described while referring to FIG. 6. The selection screen 40 is a screen for the user to select an originator telephone number for receiving an answerphone message from the originator telephone number list that is received from the multifunction peripheral 10 by the mobile phone 20.

In the selection screen 40, check boxes 41, caller names 42, and originator telephone numbers 43 are displayed in a view format (a table format).

The originator telephone numbers 43 are originator telephone numbers matching telephone numbers stored in the telephone directory of the mobile phone 20, out of originator telephone numbers included in the originator telephone number list received from the multifunction peripheral 10. An originator telephone number included in the originator telephone number list but not matching a telephone number stored in the telephone directory of the mobile phone 20 is not displayed on the selection screen 40.

The check box 41 is used for selecting an originator telephone number. In order to select an originator telephone number, the user turns on (checks) the check box 41 corresponding to the originator telephone number.

The caller names 42 are not ones transmitted from the multifunction peripheral 10 but ones stored in the telephone directory of the mobile phone 20. Specifically, for each originator telephone number, the mobile phone 20 reads out a name corresponding to the telephone number matching the originator telephone number, from the telephone directory of the mobile phone 20, and displays, on the selection screen 40, the read-out name, as the caller name, in association with the originator telephone number.

The caller name 42 and the originator telephone number 43 are an example of information associated with the telephone number matching the telephone number included in the telephone number list stored in the storage device of the mobile phone 20. Note that it is not always necessary to display the caller name 42. In that case, the originator telephone number 43 is an example of information associated with a telephone number.

(2) Mobile-Phone-Side Transmission and Reception Process

Next, a mobile-phone-side transmission and reception process according to the third embodiment will be described while referring to FIG. 7. Here, steps that are substantially the same as those in the mobile-phone-side transmission and reception process of the first embodiment are designated by the same reference numerals to avoid duplicating description.

In S401, the CPU 21A determines whether an originator telephone number list is received from the multifunction peripheral 10. If the originator telephone number list is received (S401: Yes), the process advances to S402. If the originator telephone number list is not received (S401: No), the CPU 21A repeats determination of S401 until the originator telephone number list is received. Here, if a certain time elapses without receiving the originator telephone number list, the process ends. The process that the mobile phone 20 receives the originator telephone number list from the multifunction peripheral 10 is an example of an identification-information receiving process.

In S402, the CPU 21A displays the selection screen 40 and receives selection of an originator telephone number from the user. The step S402 is an example of a user-selection receiving process.

In S403, the CPU 21A controls the WiFi communicator 25 to transmit selection information indicative of the originator telephone number selected by the user in S402, via the WiFi communicator 17, to the multifunction peripheral 10. The step S403 is an example of an identification-information transmitting process.

(3) MFP-Side Transmission and Reception Process

Next, an MFP-side transmission and reception process according to the third embodiment will be described while referring to FIG. 8. Here, steps that are substantially the same as those in the MFP-side transmission and reception process of the first embodiment are designated by the same reference numerals to avoid duplicating description.

In S501, the CPU 11A controls the WiFi communicator 17 transmits an originator telephone number list consisting of originator telephone numbers extracted in S209, via the WiFi communicator 25, to the mobile phone 20. The originator telephone number list is an example of a list of data stored in the storage device and an identification-information list consisting of identification information indicative of originators.

In S502, the CPU 11A determines whether selection information is received from the mobile phone 20. If selection information is received (S502: Yes), the process advances to S503. If selection information is not received (S502: No), the CPU 11A repeats determination of S502 until selection information is received. Here, if a certain time elapses without receiving selection information, the process ends. The process that the multifunction peripheral 10 receives selection information from the mobile phone 20 is an example of a selection receiving process.

In S503, the CPU 11A converts, to MP3 data, the answerphone message associated with the originator telephone number indicated by the selection information received from the mobile phone 20.

(4) Effects of the Embodiment

According to the multifunction peripheral 10 of the above-described third embodiment, the user of the mobile phone 20 can select an answerphone message to be transmitted to the mobile phone 20.

Further, according to the mobile phone 20 of the third embodiment, only the originator telephone numbers associated with answerphone messages having a high degree of relationship with the user of the mobile phone 20 are displayed as options. Thus, the user can easily select an answerphone message that the user wishes to be transmitted to the mobile phone 20.

<Modifications>

While the invention has been described in detail with reference to the above aspects thereof, it would be apparent to those skilled in the art that various changes and modifications may be made therein without departing from the scope of the claims.

(1) In the above-described embodiment, out of answerphone messages stored in the RAM 11C, only unplayed answerphone messages are transmitted to the mobile phone 20. In addition, answerphone messages that have already been played may also be transmitted.

(2) In the above-described embodiment, out of answerphone messages stored in the RAM 11C, only answerphone messages having play time longer than or equal to two seconds are transmitted to the mobile phone 20. In addition, answerphone messages having play time shorter than two seconds may also be transmitted.

(3) In the above-described the first embodiment, the multifunction peripheral 10 stores, in the RAM 11C, answerphone messages in association with originator telephone numbers. In contrast, answerphone messages may be stored without being associated with originator telephone numbers. In that case, out of unplayed answerphone messages, all the answerphone messages having play time longer than or equal to two seconds may be transmitted to the mobile phone 20. In that case, in S212 originator telephone numbers are not transmitted to the mobile phone 20.

(4) In the above-described second embodiment, authentication information is described as an example of user information. However, the user information is not limited to authentication information. For example, the multifunction peripheral 10 may be so configured that each function can be used without logging in. In that case, a user of the mobile phone 20 may input his or her user ID on the multifunction peripheral 10 so that the multifunction peripheral 10 can identify the user of the mobile phone 20, not for authentication purposes.

(5) In the above-described embodiment, the NFC communicator 18 is described as an example of a detector. However, the detector is not limited to the NFC communicator 18. For example, detection may be performed as follows. That is, detection light is emitted form the multifunction peripheral 10 and, when the mobile phone 20 is brought close to the multifunction peripheral 10, the light is reflected by the mobile phone 20. Then, when the multifunction peripheral 10 receives the reflected light by an optical sensor, it is determined that the mobile phone 20 is detected.

(6) In the above-described embodiment, the multifunction peripheral 10 stores answerphone messages in the RAM 11C. However, the multifunction peripheral 10 may store answerphone messages in an external file server. In this case, the external file server is an example of a storage device.

In this case, the multifunction peripheral 10 may transmit, to the mobile phone 20, a link to an answerphone message stored in the external file server, not transmitting the answerphone message itself to the mobile phone 20. Then, the user of the mobile phone 20 may operate the mobile phone 20 to access a link destination, thereby downloading the answerphone message from the file server.

(7) In the above-described embodiment, the multifunction peripheral 10 transmits an answerphone message to the mobile phone 20 by wireless communication of the WiFi direct method. However, the multifunction peripheral 10 may have a network interface for performing communication through communication network such as a LAN (Local Area Network) and the Internet, so that an answerphone message is transmitted through the communication network to an external apparatus from which the mobile phone 20 can receive data.

The external apparatus from which the mobile phone 20 can receive data is a cloud server that provides data storage service, for example. By downloading an answerphone message from the external apparatus, the mobile phone 20 can receive an answerphone message received by the multifunction peripheral 10 through the telephone network, without storing the destination address of the mobile phone 20 in the multifunction peripheral 10. In this case, the network interface is an example of a data communicator.

The external apparatus from which the mobile phone 20 can receive data may be an electronic mail (E-mail) server. For example, the multifunction peripheral 10 may acquire an electronic-mail address from the mobile phone 20 by NFC wireless communication or by WiFi direct wireless communication, and may transmit, to the electronic mail server, an answerphone message attached to an electronic mail having the electronic-mail address as the destination address. In this case, the mobile phone 20 can receive the answerphone message by electronic mail, without preliminarily storing the electronic-mail address on the multifunction peripheral 10.

(8) In the above-described embodiment, a part of processes executed by the multifunction peripheral 10 may be performed by the mobile phone 20. For example, determination of unplayed message performed in S202 by the multifunction peripheral 10 in the first embodiment may be performed by the mobile phone 20. Specifically, for example, the multifunction peripheral 10 may transmit originator telephone numbers of all the stored answerphone messages to the mobile phone 20, and the mobile phone 20 may determine whether the answerphone messages are unplayed.

Further, for example, determination of whether there is an originator telephone number matching a telephone number stored in the telephone directory of the mobile phone 20 performed in S210 by the multifunction peripheral 10 may be performed by the mobile phone 20. Specifically, for example, the multifunction peripheral 10 may transmit originator telephone numbers of all the stored answerphone messages to the mobile phone 20, and the mobile phone 20 may determine whether there is an originator telephone number matching a telephone number stored in the telephone directory of the mobile phone 20.

The same goes for determination of whether there is an originator telephone number matching a telephone number included in the telephone number list of the user, performed in S304 by the multifunction peripheral 10 in the second embodiment. That is, the multifunction peripheral 10 may transmit, to the mobile phone 20, originator telephone numbers of all the stored answerphone messages and the telephone number list of the user of the mobile phone 20, and the mobile phone 20 may perform the above-mentioned determination.

(9) In the above-described embodiment, a telephone number is described as an example of identification information. However, the identification information is not limited to the telephone number, as long as the identification information is information that can uniquely identify an originator. For example, the identification information may be a name associated with the telephone number of an originator, or may be some number.

(10) In the above-described embodiment, unplayed answerphone messages that have not been played by the output device 19 of the multifunction peripheral 10 are transmitted to the mobile phone 20. In contrast, unplayed answerphone messages that have not yet been played by the output device 19 of the multifunction peripheral 10 and that have not yet been transmitted to the mobile phone 20 may be transmitted. This is because it is assumed that the user of the mobile phone 20 is unlikely to desire to receive answerphone messages that have been already transmitted to the mobile phone 20.

(11) In the above-described embodiment, an answerphone message, that is, voice data is described as an example of data.

In contrast, the data may be FAX data. In this case, the printer 14 is an example of an output device.

(12) In the above-described embodiment, the multifunction peripheral 10 is described as an example of a communication apparatus. However, the communication apparatus may be a single-function FAX apparatus, or may be a telephone instrument that does not have a FAX function.

(13) In the above-described embodiment, the mobile phone 20 is described as an example of a mobile terminal. However, the mobile terminal may be a notebook-type personal computer, a tablet device, and so on.

(14) In the above-described embodiment, the CPU 11A executes the processes. However, the ASIC 11D may execute a part of the processes. Further, the ASIC 11D may not be provided in the apparatus-side controller 11. Further, the apparatus-side controller 11 may have a plurality of CPUs, and the plurality of CPUs may share execution of the above-described processes. The same goes for the terminal-side controller 21.

According to the above-described communication apparatus, the communication system, and the program, it is possible to, by using a mobile terminal, read out data received through a telephone network by a communication apparatus even if a destination address is not stored in the communication apparatus.

What is claimed is:

1. A communication apparatus comprising:
   a telephone communicator configured to perform communication through a telephone network;
   a detector;
   a data communicator; and
   a controller configured to perform:
      a data receiving process of controlling the telephone communicator to receive voice data
      a storing process of storing, in a storage device, the voice data received in the data receiving process;
      a determining process of determining whether a mobile terminal is detected by the detector; and
      a data transmitting process of, in response to determining that the mobile terminal is detected in the determining process, controlling the data communicator to transmit the voice data stored in the storage device to one of the mobile terminal and an external apparatus configured to transmit voice data to the mobile terminal,
   wherein the controller is configured to, in the data transmitting process, transmit the voice data having a play time longer than or equal to a particular time, and not transmit the voice data having a play time shorter than the particular time, the play time being time required to play the voice data.

2. The communication apparatus according to claim 1, wherein the controller is configured to:
   in the storing process, store the voice data received in the data receiving process in association with identification information indicative of an originator of the voice data; and
   in the data transmitting process, transmit the voice data and the identification information associated with the voice data.

3. The communication apparatus according to claim 1, further comprising an output device,
   wherein the controller is configured to:
      perform an outputting process of controlling the output device to output the voice data stored in the storage device; and
      in the data transmitting process, transmit voice data that is not yet outputted in the outputting process, out of the data stored in the storage device.

4. The communication apparatus according to claim 1, wherein the detector comprises a wireless communicator; and
   wherein the controller is configured to, in the determining process, determine that the mobile terminal is detected when communication is established with the mobile terminal through the wireless communicator.

5. The communication apparatus according to claim 4, wherein a communication speed of the data communicator is higher than a communication speed of the wireless communicator.

6. A communication apparatus comprising:
   a telephone communicator configured to perform communication through a telephone network;
   a detector;
   a data communicator; and
   a controller configured to perform:
      a data receiving process of controlling the telephone communicator to receive data;
      a storing process of storing, in a storage device, the data received in the data receiving process in association with identification information indicative of an originator of the data;
      a determining process of determining whether a mobile terminal is detected by the detector;
      an identification-information receiving process of, in response to determining that the mobile terminal is detected in the determining process, controlling the data communicator to receive an identification-information list from the mobile terminal;
      an identifying process of identifying particular identification information that matches identification information included in the identification-information list received in the identification-information receiving process; and
      a data transmitting process of controlling the data communicator to transmit the data associated with the particular identification information to one of the mobile terminal and an external apparatus configured to transmit data to the mobile terminal.

7. A communication apparatus comprising:
   a telephone communicator configured to perform communication through a telephone network;
   a detector;
   a data communicator;
   a storage device configured to store an identification-information list for each user; and
   a controller configured to perform:
      a data receiving process of controlling the telephone communicator to receive data;
      a storing process of storing, in the storage device, the data received in the data receiving process in association with identification information indicative of an originator of the data;
      a determining process of determining whether a mobile terminal is detected by the detector;
      an acquiring process of, in response to determining that the mobile terminal is detected in the determining process, acquiring user information indicative of a user of the mobile terminal;
      an identifying process of identifying particular identification information that matches identification information included in the identification-information list of the user indicated by the user information; and a data transmitting process of controlling the data communicator to transmit the data associated with the particular identification information to one of the mobile terminal and an external apparatus configured to transmit data to the mobile terminal.

8. A communication apparatus comprising:
a telephone communicator configured to perform communication through a telephone network;
a detector;
a data communicator; and
a controller configured to perform:
    a data receiving process of controlling the telephone communicator to receive data;
    a storing process of storing, in a storage device, the data received in the data receiving process;
    a determining process of determining whether a mobile terminal is detected by the detector;
    a list transmitting process of, in response to determining that the mobile terminal is detected in the determining process, controlling the data communicator to transmit a list of the data stored in the storage device to the mobile terminal;
    a selection receiving process of receiving, from the mobile terminal, selection information indicative of data selected by the mobile terminal out of the data included in the list of the data; and
    a data transmitting process of controlling the data communicator to transmit the data indicated by the selection information out of the data stored in the storage device to one of the mobile terminal and an external apparatus configured to transmit data to the mobile terminal.

9. The communication apparatus according to claim 6, further comprising an output device,
    wherein the controller is configured to:
        perform an outputting process of controlling the output device to output the data stored in the storage device; and
        in the data transmitting process, transmit data that is not yet outputted in the outputting process, out of the data stored in the storage device.

10. The communication apparatus according to claim 6, wherein the detector comprises a wireless communicator; and
    wherein the controller is configured to, in the determining process, determine that the mobile terminal is detected when communication is established with the mobile terminal through the wireless communicator.

11. The communication apparatus according to claim 10, wherein a communication speed of the data communicator is higher than a communication speed of the wireless communicator.

12. The communication apparatus according to claim 7, further comprising an output device,
    wherein the controller is configured to:
        perform an outputting process of controlling the output device to output the data stored in the storage device; and
        in the data transmitting process, transmit data that is not yet outputted in the outputting process, out of the data stored in the storage device.

13. The communication apparatus according to claim 7, wherein the detector comprises a wireless communicator; and
    wherein the controller is configured to, in the determining process, determine that the mobile terminal is detected when communication is established with the mobile terminal through the wireless communicator.

14. The communication apparatus according to claim 13, wherein a communication speed of the data communicator is higher than a communication speed of the wireless communicator.

15. The communication apparatus according to claim 8, further comprising an output device,
    wherein the controller is configured to:
        perform an outputting process of controlling the output device to output the data stored in the storage device; and
        in the data transmitting process, transmit data that is not yet outputted in the outputting process, out of the data stored in the storage device.

16. The communication apparatus according to claim 8, wherein the detector comprises a wireless communicator; and
    wherein the controller is configured to, in the determining process, determine that the mobile terminal is detected when communication is established with the mobile terminal through the wireless communicator.

17. The communication apparatus according to claim 16, wherein a communication speed of the data communicator is higher than a communication speed of the wireless communicator.

* * * * *